United States Patent [19]

Inami et al.

[11] Patent Number: 4,553,179

[45] Date of Patent: Nov. 12, 1985

[54] AUTOMATIC RECORDING BIAS CURRENT SETTING APPARATUS

[75] Inventors: Mamoru Inami, Yokohama; Zenju Ohtsuki, Tokyo; Yoshiaki Tanaka, Fujisawa; Tomohiro Mori; Akio Hasegawa, both of Maebashi, all of Japan

[73] Assignee: Victor Company of Japan Ltd., Yokohama, Japan

[21] Appl. No.: 434,101

[22] Filed: Oct. 13, 1982

[30] Foreign Application Priority Data

Oct. 15, 1981 [JP] Japan .................................. 56-164501
Dec. 2, 1981 [JP] Japan .................................. 56-194247

[51] Int. Cl.$^4$ ......................... G11B 15/02; G11B 5/47
[52] U.S. Cl. ......................................... 360/66; 360/25
[58] Field of Search ....................... 360/28, 31, 66, 68, 360/65

[56] References Cited

U.S. PATENT DOCUMENTS

| | | | |
|---|---|---|---|
| 4,253,122 | 2/1981 | Tabata | 360/66 |
| 4,279,005 | 7/1981 | Kitamura et al. | 360/66 |
| 4,344,094 | 8/1982 | Ohtake et al. | 360/66 |
| 4,352,130 | 9/1982 | Hasegawa et al. | 360/66 |
| 4,422,109 | 12/1983 | Sampei et al. | 360/66 |
| 4,433,349 | 2/1984 | Kimura | 360/66 |

FOREIGN PATENT DOCUMENTS

| | | | |
|---|---|---|---|
| 2912575 | 5/1981 | Fed. Rep. of Germany | 360/60 |
| 762928 | 12/1956 | United Kingdom | 360/60 |
| 2019075A | 10/1979 | United Kingdom | 360/60 |
| 1561446 | 2/1980 | United Kingdom | 360/60 |

Primary Examiner—Vincent P. Canney
Attorney, Agent, or Firm—Posnack, Roberts, Cohen & Spiecens

[57] ABSTRACT

An automatic recording bias current setting apparatus comprises a bias current generating circuit for generating a bias current with varied level of the bias current, a testing signal generating circuit for generating two kinds of testing signals having different mid and high frequencies of an audio signal, by independently varying the levels of the testing signals, a recording and reproducing circuit for recording the two kinds of testing signals with the bias current onto a magnetic recording medium and reproducing the same, and a bias current detecting circuit for detecting the level of a bias current. The recording and reproducing circuit repeats an operation in which the two kinds of testing signals are recorded onto the magnetic recording medium and then reproduced with independently varied levels of the two kinds of testing signals under the same bias current obtained from the bias current generating circuit, for each of the different varied bias currents. The bias current detecting circuit detects respective reproduced output levels of the two kinds of testing signals with respect to the different bias currents, to detect a bias current level at a point where a difference between respective maximum reproduced output levels becomes equal to a preset predetermined value.

14 Claims, 24 Drawing Figures

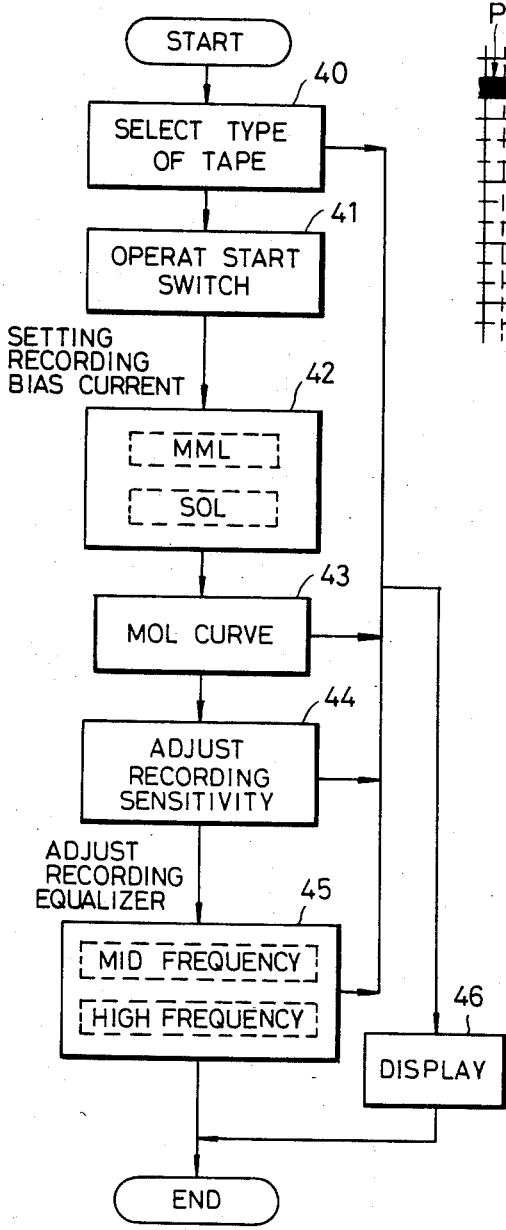
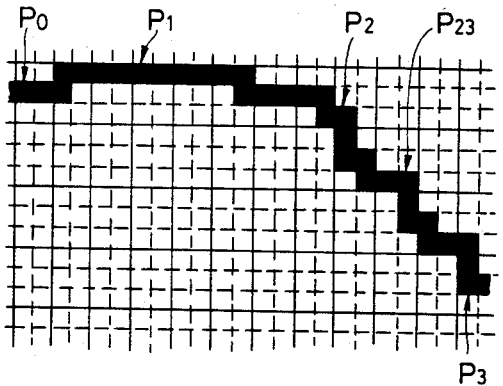
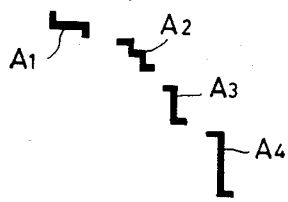
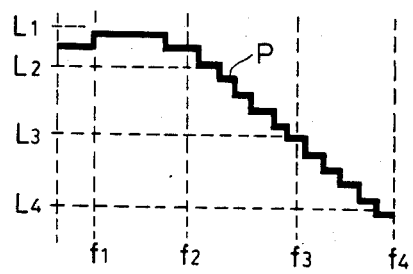

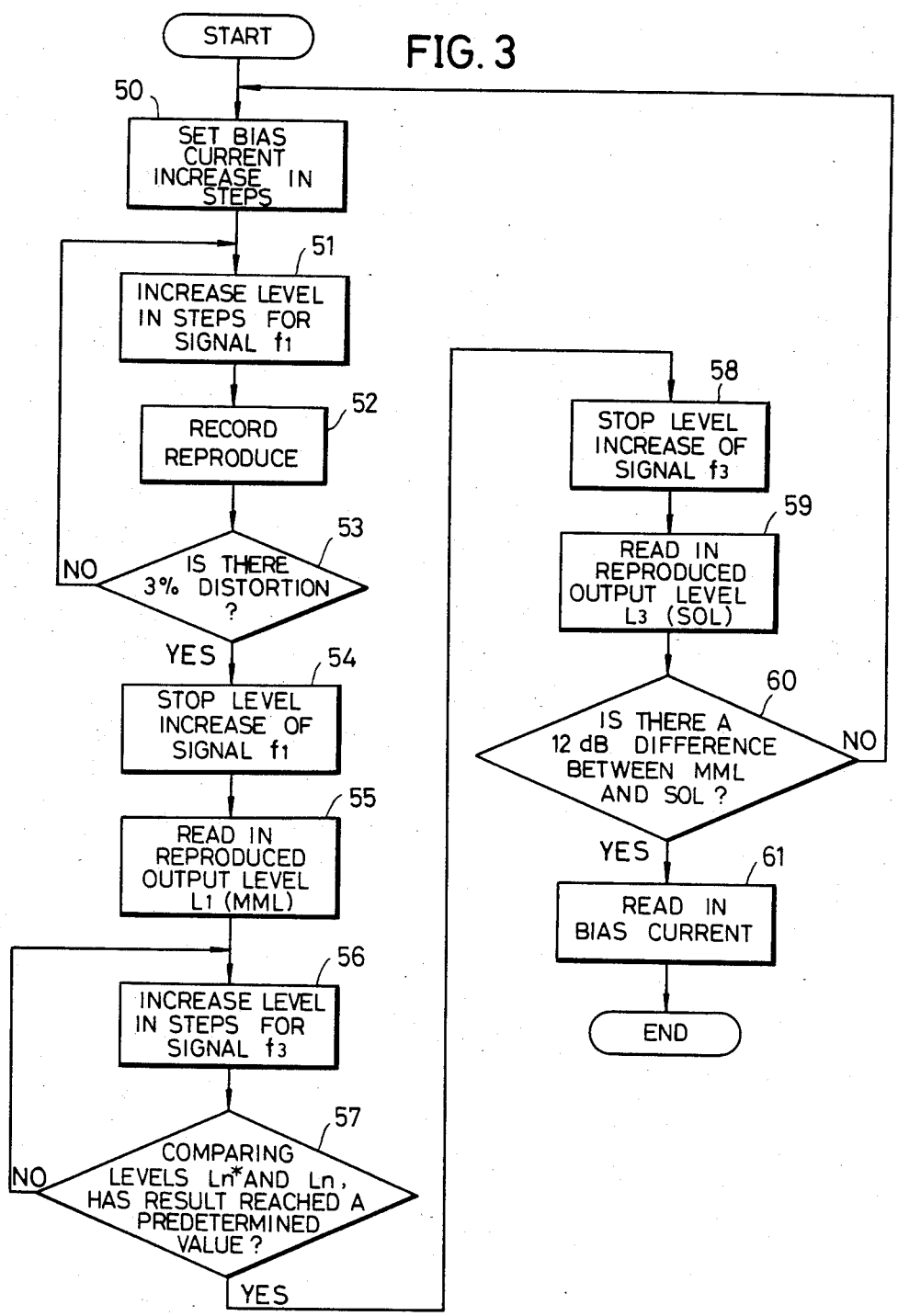

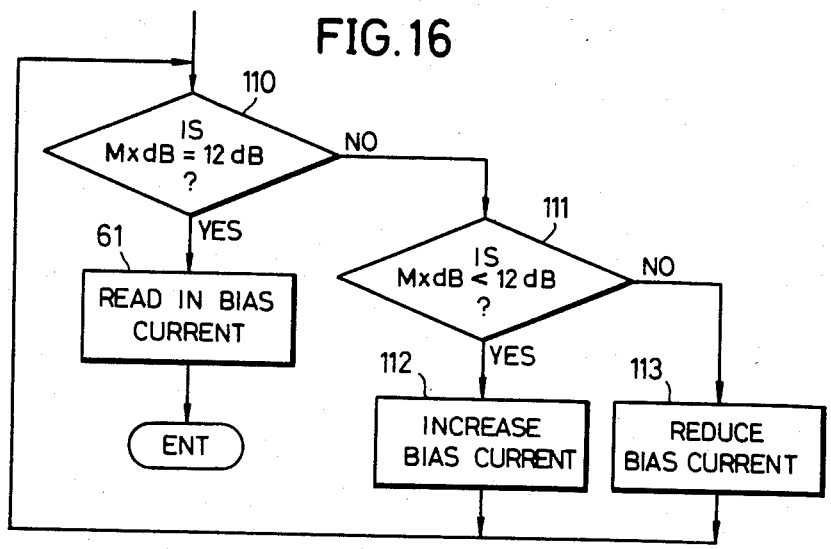
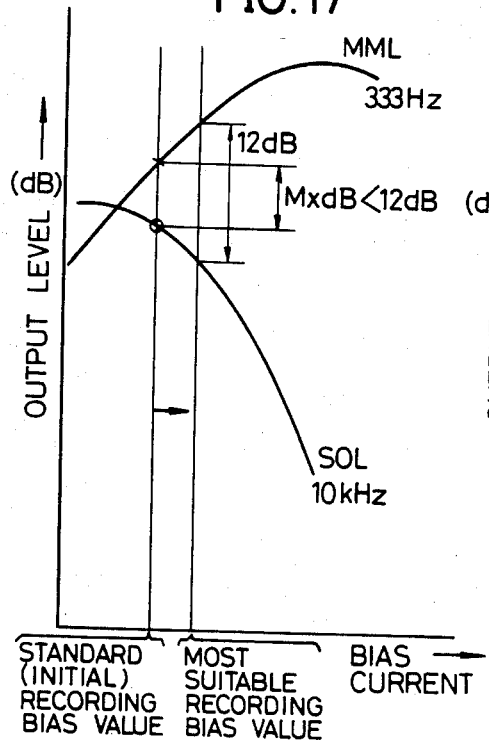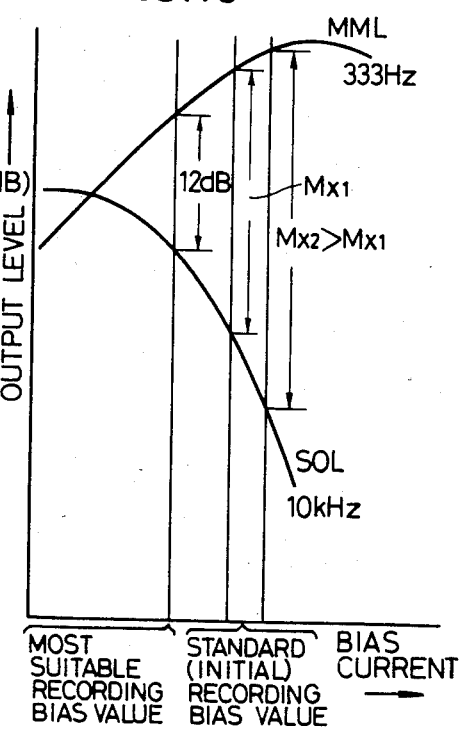

AUTOMATIC RECORDING BIAS CURRENT SETTING APPARATUS

BACKGROUND OF THE INVENTION

The present invention generally relates to automatic recording bias current setting apparatuses, and more particularly to an automatic recording bias current setting apparatus capable of automatically setting a most suitable recording bias current for a tape being used in a tape recorder which records and reproduces audio signals from the tape which has been arbitrarily selected from among different types of tapes.

If cassette tapes presently being marketed are generally classified, there are four types of cassette tapes, mainly, the normal type, chrome type, ferrichrome type, and the metal type cassette tapes. The magnetic characteristic of the same tape slightly differs according to the manufacturer. On the other hand, a tape selector is provided in a cassette deck for switching modes of the recording bias current, recording sensitivity, recording equalizer, and the like in three to four stages. The manufacturer adjusts the above recording bias current, recording sensitivity, recording equalizer, and the like, so that characteristics such as the frequency characteristic, distortion factor, signal-to-noise ratio, maximum output level (hereinafter simply referred to as MOL), and the like with respect to the tape being used becomes most suitable as a whole. Accordingly, when recording is to be carried out by using a tape other than that used by the manufacturer upon the above described adjustment, the recording cannot be carried out by utilizing the performance of the tape used to a maximum.

Hence, in order to use the tapes having various magnetic characteristics in a most suitable state, apparatuses have been developed conventionally for automatically performing the above various adjustments by use of a microcomputer, for example. These apparatuses mainly perform the adjustment of the recording bias current setting, adjustment of the recording sensitivity, and adjustment of the recording equalizer for mid and high frequencies, automatically and successively, for each of the above four type of tapes.

The adjustment of the recording bias current setting is particularly important. Internationally, it is recommended to record testing signals respectively having frequencies 333 Hz and 10 kHz onto a tape to be used by maintaining the recording level constant and gradually varying the respective bias currents, and set a bias current at a point where the difference between a MOL (maximum modulation level, or output level reproduced with a 3% distortion, and hereinafter simply referred to as a MML) of the testing signal of 333 Hz and a MOL (reproduced saturation output level, and hereinafter simply referred to as a SOL) of the testing signal of 10 kHz becomes equal to 12 dB when these testing signals are reproduced, as a most suitable bias current for that tape. However, the conventional apparatus does not employ two kinds of testing signals having frequencies of 333 Hz and 10 kHz, respectively. Further, in the conventional apparatus, the testing signal is recorded at a constant level even when the bias current is changed. Therefore, the bias current which was set as being the optimum value in the conventional apparatus, merely relied on the following three kinds of approximation.

One method generates the testing signal of 333 Hz from a testing signal generator within the reproducing apparatus, and records this testing signal onto the tape to be used by maintaining the recording level constant and gradually varying the bias current. The recorded testing signal is then reproduced, and a peak value is automatically detected. A bias current at a point when the peak value is detected, is set as the recording bias current. According to a second method, the testing signal of 333 Hz is recorded and reproduced as in the above first method. Then, a point where there is a reduction of 2.5 dB from the peak value is detected automatically, and a bias current at this detected point is set as the recording bias current. In a third method, the testing signals of 333 Hz and 6.3 kHz are both recorded and reproduced as in the above first and second methods, and a point where the reproduced level of the testing signal of 6.3 kHz is lower than the reproduced peak level of the testing signal of 333 Hz by 6 dB is automatically detected. A bias current at this detected point is accordingly set as the recording bias current.

However, the above conventional methods for setting the recording bias current are all approximation methods. Hence, there is an error between the recording bias current obtained, and the recording bias current at a point where the difference between the MOL (MML) of the testing signal of 333 Hz and the MOL (SOL) of the testing signal of 10 kHz becomes equal to 12 dB (the recording bias current set according to the internationally recommended method). Therefore, there was a disadvantage in that an accurate recording bias current could not be set.

SUMMARY OF THE INVENTION

Accordingly, it is a general object of the present invention to provide a novel and useful automatic recording bias current setting apparatus in which the above described disadvantages have been overcome.

Another and more specific object of the present invention is to provide an automatic recording bias current setting apparatus which truely follows the above internationally recommended method, that is, an apparatus in which mid and high frequency signals are respectively recorded and reproduced, and a bias current at a point where the difference between the respective maximum reproduced output levels becomes equal to a predetermined value is detected, to automatically set a most suitable recording bias current for the magnetic tape used. According to the apparatus of the present invention, an accurate recording bias current can be set as compared to the conventional setting methods using approximation.

Still another object of the present invention is to provide an automatic recording bias current setting apparatus in which the above mid and high frequency signals are recorded and reproduced under a standard recording bias current prepared in advance, and a bias current at a point where the difference between the respective maximum reproduced output levels becomes equal to a predetermined value is detected, to automatically set a most suitable recording bias current for the magnetic tape used. According to the apparatus of the present invention, the most suitable recording bias current can be obtained within a shorter period of time, compared to the method wherein an arbitrary bias current is used as a test starting point and the bias current is varied by small quantities to detect the level difference between the maximum reproduced output levels.

Another object of the present invention is to provide an automatic recording bias current setting apparatus capable of displaying MOL curves and level bars of the recording signals. According to the apparatus of the present invention, the MOL of the tape used can be observed with ease, and it is possible to monitor the levels so that the level bars do not exceed the MOL curve.

Other objects and further features of the present invention will be apparent from the following detailed description when read in conjunction with the accompanying drawings.

BRIEF DESCRIPTION OF THE DRAWINGS

FIG. 2 is a general flowchart for explaining the general operation of the embodiment of the apparatus according to the present invention;

FIG. 3 is a flowchart for explaining the operation of an essential part of the embodiment of the apparatus according to the present invention;

FIG. 16 is a flowchart for explaining the operation of an essential part of the other embodiment of the apparatus according to the present invention;

FIGS. 17 and 18 are graphs respectively showing a bias current versus output level characteristic for explaining the method of obtaining the recording bias current by the other embodiment of the apparatus according to the present invention;

FIG. 21 is a diagram for explaining an embodiment of a display format for the MOL curve in the apparatus according to the present invention;

FIG. 22 is a diagram showing the sectioned MOL curve stored in a RAM; and

FIG. 23 is a diagram for explaining the whole MOL curve.

DETAILED DESCRIPTION

Figure 1:
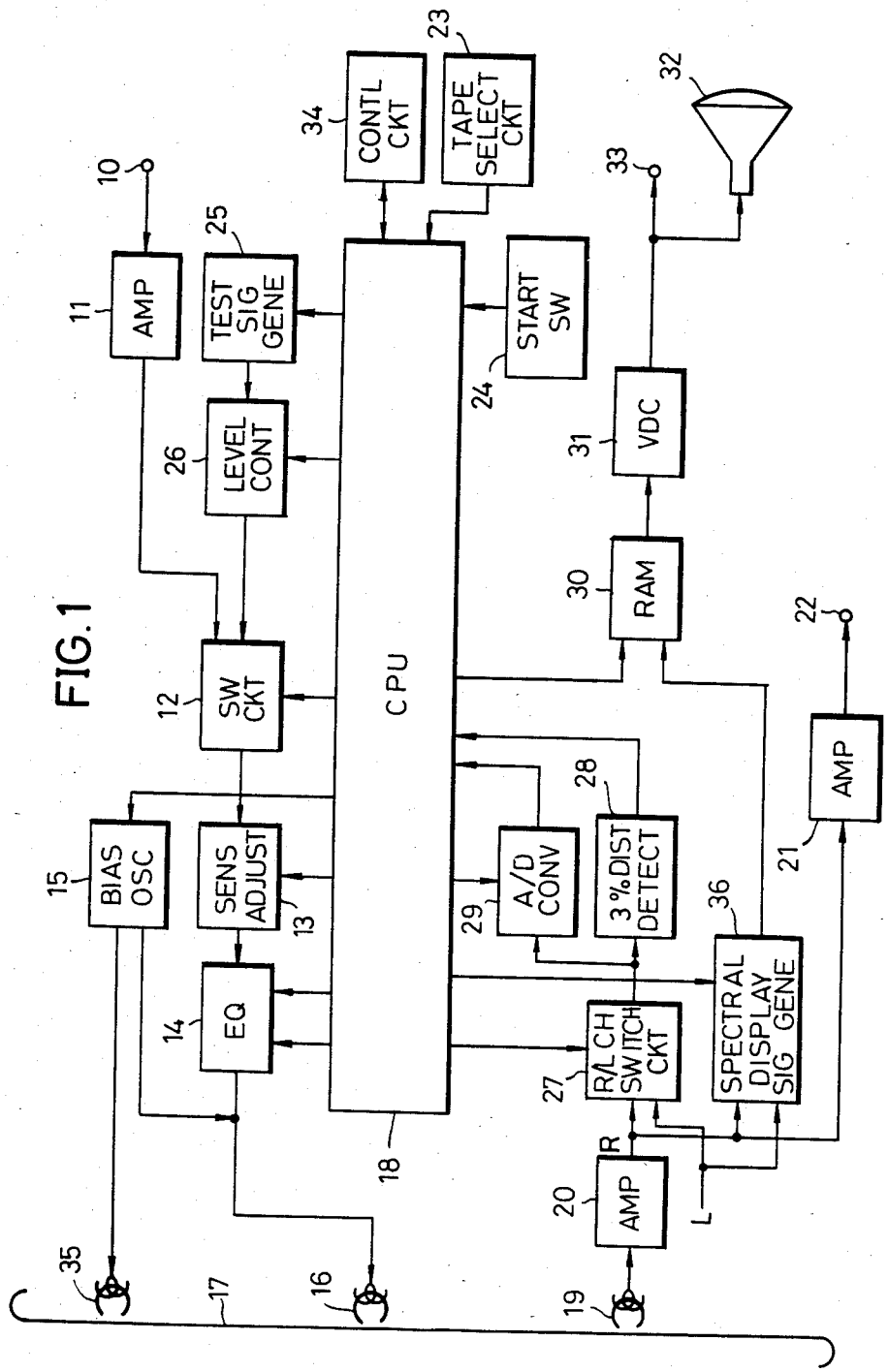
FIG. 1 is a general systematic block diagram showing a tape recorded applied with an embodiment of an automatic recording bias current setting apparatus according to the present invention.

First, description will be given with respect to general recording and reproduction, by referring to FIG. 1. In FIG. 1, an incoming audio signal is applied to an input terminal 10, and passed through a line amplifier 11 and a switching circuit 12. An output of the switching circuit 12 is supplied to a sensitivity adjustor 13 wherein a characteristic is preset, and adjusted of the sensitivity. An output signal of this sensitivity adjustor 13 is supplied to a frequency characteristic adjustor (equalizer) 14, and adjusted of the frequency characteristic. Further, an output of the equalizer 14 is multiplexed with a bias current from a bias oscillator 15 in which a recording bias current is preset, and supplied to a recording head 16 and recorded onto a magnetic tape 17. The sensitivity adjustor 13, equalizer 14, and bias oscillator 15 are respectively controlled by control signals from a central processing unit (CPU) 18. Accordingly, signals to be recorded are recorded in a most suitable state through the adjustments at the above circuits.

Upon reproduction, a signal reproduced from the tape 17 by a reproducing head 19 is obtained at an output terminal 22, through a reproducing amplifier 20 and a line amplifier 21.

Next, description will be given with respect to various adjustments performed before recording the signal to be recorded onto the tape 17. First, description will be given with respect to the operation for automatically setting the recording bias current, by referring to FIGS. 1 through 3. If the tape being used is a normal type tape, for example, a tape selecting circuit 23 is operated at a step 40 to set the setting for the normal type tape. When a start switch 24 is operated at a step 41, setting of the recording bias current at a step 42 is performed by a control signal from the CPU 18.

In FIG. 3, a certain bias current is set at a step 50. Then, a first testing signal $f_1$ having a frequency 333 Hz is obtained from a testing signal generator 25 at a step 51. This first testing signal $f_1$ is supplied to a level control circuit 26 which is operated by a control signal from the CPU 18, and obtained as a signal of a specific level. The output of this level control circuit 26 is supplied to the switching circuit 12, and the switching circuit 12 is switched over and connected to the side of the level control circuit 26. The above first testing signal $f_1$ is supplied to a right-channel (R-channel) recording head 16, for example, through the switching circuit 12, sensitivity adjustor 13, and the equalizer 14, and recorded onto a right channel (R-channel) on the tape 17 at a step 52. The first testing signal $f_1$ thus recorded, is reproduced by the R-channel reproducing head 19, and supplied to a 3% distortion detector 28 through the reproducing amplifier 20 and a right-and-left (R/L) channel switching circuit 27.

Figure 4:
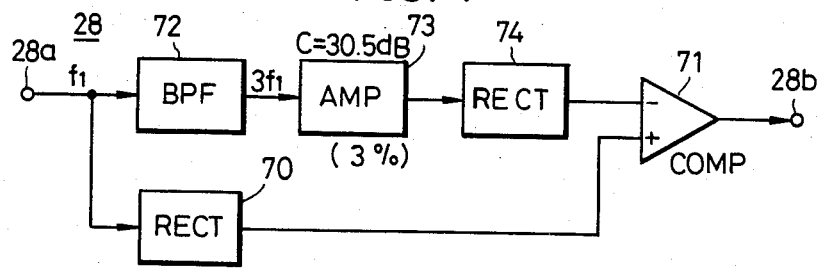
FIG. 4 is a concrete circuit diagram showing a 3% distortion detector within the block system shown in FIG. 1.

The 3% distortion detector 28 has a construction shown in FIG. 4, for example. The first testing signal $f_1$ having the frequency 333 Hz is applied to a terminal 28a and converted into a DC component at a rectifier 70, and then supplied to one input terminal of a comparator 71. On the other hand, the above first testing signal $f_1$ is also supplied to a bandpass filter 72 having a center frequency of 1 kHz, and only the frequency component $3f_1$ (that is, the third order harmonic of the first testing signal $f_1$) is obtained from the bandpass filter 72. The output of the bandpass filter 72 is supplied to an amplifier 73 having a gain of 30.5 dB and amplified of the level, and supplied to the other input terminal of the comparator 71 through a rectifier 74. Level comparison is performed between the DC component of the first testing signal $f_1$ and the DC component of the signal $3f_1$, at the comparator 71.

Figure 5:
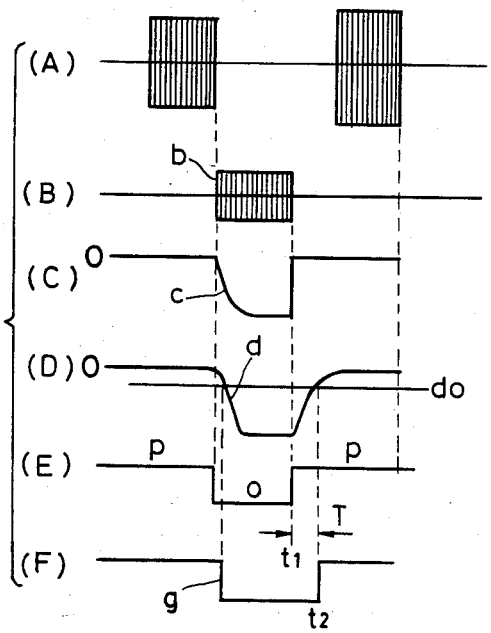
FIGS. 5(A) through 5(F) are graphs respectively showing signal waveforms for explaining the operation of an A/D converter within the block system shown in FIG. 1.
Figure 6:
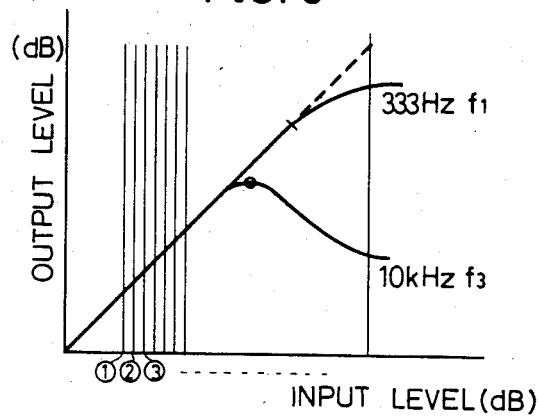
FIG. 6 is a graph showing an input level versus output level characteristic when obtaining the MOL of the testing signal in the apparatus according to the present invention.

The output of the level control circuit 26 is intermittently varied according to a control signal from the CPU 18. Thus, as shown in FIG. 5(A), the first testing signal $f_1$ is obtained in a state where the level of the first testing signal $f_1$ increases in steps. The reproduced signal becomes as shown in FIG. 5(B). Accordingly, the input versus output level characteristic becomes as shown in FIG. 6 wherein the output level varies according to the step increase of the input signal as indicated by ①, ②, .... The output of the comparator 71 is constantly supplied to the CPU 18, and it is observed whether a detection signal (3% distortion detection signal) from the comparator 71 at a step 53.

When the output levels of the rectifiers 70 and 74 become equal, a low-level detection signal, for example, is obtained from the comparator 71. The low-level detection signal is obtained through an output terminal 28b and supplied to the CPU 18. In this case, the gain of the amplifier 73 is set to 30.5 dB (the value at 3% with respect to 0 dB), because an input level point (indicated by a mark "x" in FIG. 6) where the 3% distortion component (third order harmonic $3f_1$) is included within the first testing signal $f_1$ having the frequency 333 Hz is to be obtained. By setting the gain of the amplifier 73 in this manner, a point where a signal obtained from the low-level distortion component $3f_1$ by giving a gain of 30.5 dB and the first testing signal $f_1$ coincide, becomes a point where the output level is distorted by 3% with respect to the input level.

The above described steps 51 through 53 are repeatedly performed until the 3% distortion detection signal is obtained from the comparator 71.

When the detection signal is obtained from the comparator 71, the level increase with respect to the first testing signal $f_1$ is stopped at a step 54, and an analog-to-digital (A/D) converter 29 is operates by a control signal from the CPU 18. The reproduced output level of the first testing signal $f_1$ at this point (indicated by a mark "x" in FIG. 6) is converted into a digital signal (level $L_1$), and supplied to the CPU 18. The CPU 18 reads in the reproduced output level $L_1$ at a step 55.

Figure 7:
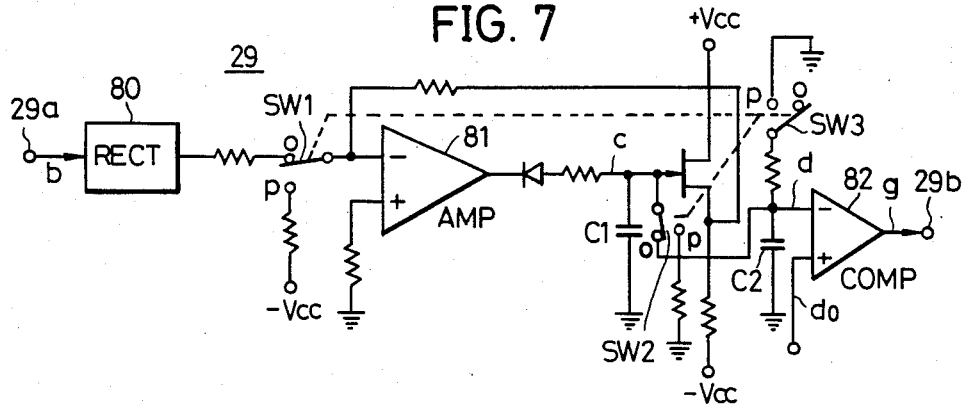
FIG. 7 is a concrete circuit diagram showing the A/D converter within the block system shown in FIG. 1.

The A/D converter 29 has a construction shown in FIG. 7. A reproduced signal b shown in FIG. 5(B) applied to an input terminal 29a, is rectified at a rectifier 80. Switches $SW_1$, $SW_2$, and $SW_3$ are linked, and respectively connected to a terminal o during the existence period of the reproduced signal b and connected to a terminal p during other periods, by a control signal from the CPU 18. A signal from the rectifier 80 charges a capacitor $C_1$ through the switch $SW_1$ and an amplifier 81. This capacitor $C_1$ is charged by a quantity in accordance with the signal level, and a voltage c shown in FIG. 5(C) is obtained from the terminal of the capacitor $C_1$. This voltage c is applied to a capacitor $C_2$. Thus, a signal d shown in FIG. 5(D) is obtained from the terminal of the capacitor $C_2$ and supplied to an inverting input terminal of a comparator 82. Slopes of the rising and falling curves of the signal d differs according to the level of the reproduced signal b.

The level of the signal d is compared with a threshold level $d_o$ at the comparator 82. Hence, a signal g shown in FIG. 5(F) is obtained from the comparator 82 and supplied to the CPU 18. An interval T between a time $t_1$ indicated in FIG. 5(E) when the switch $SW_3$ is closed to a time $t_2$ when the signal g rises to high level, is measured at the CPU 18. Thus, a digital signal in accordance with the reproduced output level $L_1$ of the first testing signal $f_1$ is obtained.

When the reproduced output level $L_1$ of the first testing signal $f_1$ is subjected to analog-to-digital (A/D) conversion and supplied to the CPU 18, the CPU 18 operates the testing signal generator 25 so as to obtain a third testing signal $f_3$ having a frequency of 10 kHz, at a step 56. As in the case of the above described first testing signal $f_1$, the third testing signal $f_3$ is converted into a signal which gradually increases in steps, and recorded onto and reproduced from the tape 17. In this case, measures are taken so that the signal from the 3% distortion detector 28 is neglected. The reproduced level of the third testing signal having the frequency 10 kHz which is obtained from the switching circuit 27, is subjected to A/D conversion at the A/D converter 29 and then supplied to the CPU 18. The CPU 18 constantly compares a reproduced output level $L_n$* presently being supplied thereto with a reproduced output level $L_n$ supplied at a stage immediately prior thereto, at a step 57. The CPU 18 controls the level control circuit 26 so that the level of the third testing signal $f_3$ is increased in steps during an interval in which the above difference between the levels $L_n$* and $L_n$ are less than a predetermined value. On the other hand, when the above difference reaches the predetermined value (that is, at a point indicated by a mark "o" for the third testing signal $f_3$ in FIG. 5 whereat the maximum reproduced output level is obtained), the level control circuit 26 is controlled so that the step increase of the third testing signal $f_3$ is stopped, at a step 58. The CPU 18 is supplied with the maximum reproduced output level of the third testing signal $f_3$ when the above difference reached the predetermined value, at a step 59. Accordingly, the CPU 18 reads in the MML of the first testing signal $f_1$ (indicated by the mark "x") and the SOL of the third testing signal $f_3$ (indicated by the mark "o").

When detecting the MML of the first testing signal $f_1$ and the SOL of the third testing signal $f_3$, the predetermined output level may be obtained by gradually increasing the input levels of the first and third testing signals $f_1$ and $f_3$ in steps from a relatively low level, as shown in FIG. 6. As another method of obtaining the predetermined output level, the input levels of the first and third testing signals $f_1$ and $f_3$ may be roughly increased by a certain intervals indicated by ①and ② in FIG. 8. According to this second method, the input levels are increased by small intervals as indicated by m+1, m+2, ... in FIG. 8 as the input levels approach the predetermined output level, in order to obtain the predetermined output level.

Figure 9:
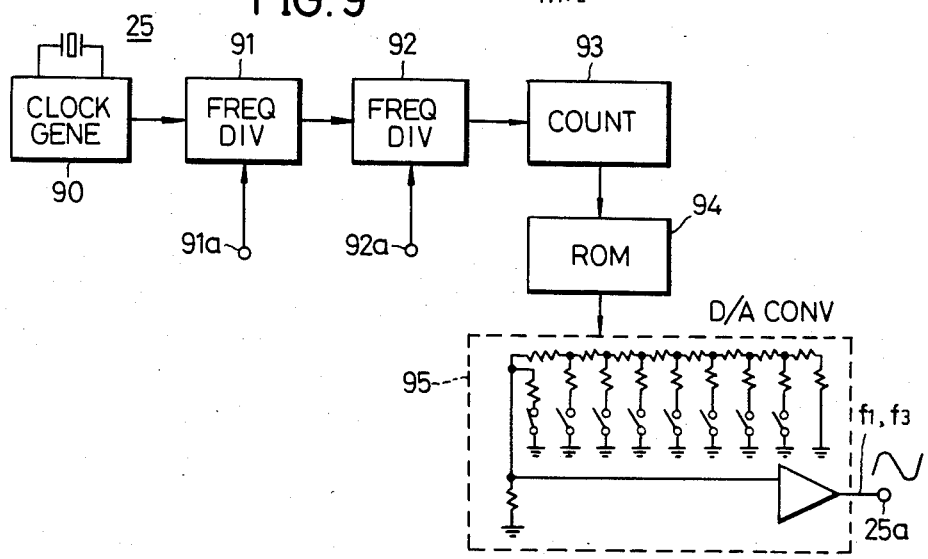
FIG. 9 is a concrete circuit diagram showing a testing signal generator within the block system shown in FIG. 1.

The testing signal generator 25 is constructed from a circuit shown in FIG. 9. A signal from a clock generator 90 An output of the clock generator 90 is supplied to a frequency divider 91 and then to another frequency divider 92. These frequency dividers 91 and 92 are varies of the respective frequency dividing ratios according to control signals applied to control terminals 91a and 92a from the CPU 18. Hence, the signals are frequency-divided at the frequency dividers 91 and 92, and formed into signals in accordance with the frequencies of the first and third testing signals $f_1$ and $f_3$. The output of the frequency divider 92 is supplied to a counter 93, and converted into an 8-bit address signal, for example, equal to the length of data within a read only memory (ROM) 94 provided at a succeeding stage. The 8-bit signal from the ROM 94 is supplied to a digital-to-analog (D/A) converter 95 as a switching signal. Switches in the D/A converter 95 are opened and closed according to the address signal from the ROM 94. Accordingly, sinusoidal wave signals (first and third testing signals $f_1$ and $f_3$) having predetermined frequencies, are obtained from an output terminal 25a.

Figure 8:
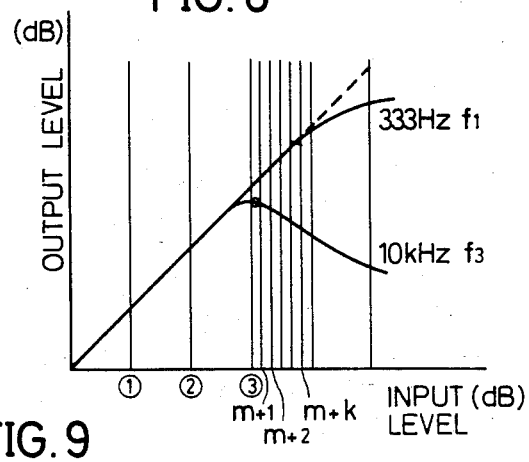
FIG. 8 is a graph showing an input level versus output level characteristic when obtaining the MOL of the testing signal in the apparatus according to the present invention.
Figure 10:
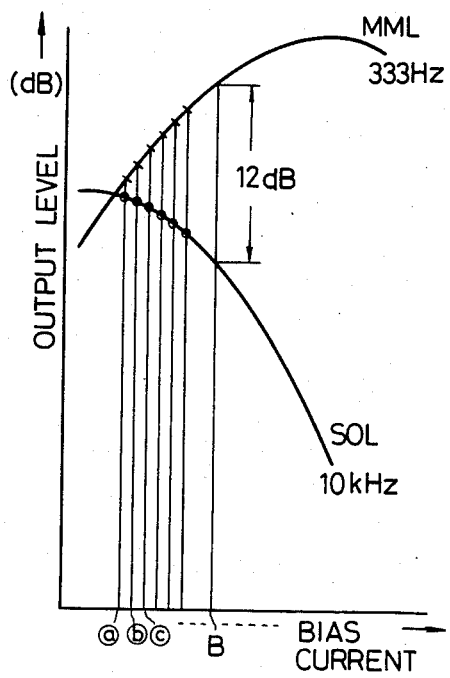
FIG. 10 is a graph showing a bias current versus output level characteristic for explaining the method of obtaining the recording bias current according to the embodiment of the apparatus according to the present invention.

When obtaining the MML and the SOL shown in FIG. 6 or 8, the bias current at the bias oscillator 15 is set at a certain bias current shown in FIG. 10 (the bias current indicated by ⓐ, for example) by a control signal from the CPU 18. Then, the bias oscillator 15 is controlled by the CPU 18, and a bias current indicated by ⓑ in FIG. 10, for example, which is obtained by increasing the bias current ⓐ by one step, is obtained from the bias oscillator 15 at the step 50. The MML of the first testing signal $f_1$ and the SOL of the third testing signal $f_3$ are obtained by the above described method by performing the steps 51 through 59, under the bias current indicated by ⓑ. That is, the recording is carried out under a certain bias current by varying the input level, and a point where the reproduced output level becomes maximum is obtained (the MML of the first testing signal $f_1$ and the SOL of the third testing signal $f_3$). Next, the bias current is varied, and the input level is varied under this varied bias current, to obtain a point where the reproduced output level becomes maximum. Such operation is repeated. Thus, the MML curve and the SOL curve shown in FIG. 10 are obtained.

The values of the MML and the SOL are constantly supplied to the CPU 18, and it is observed whether the difference between the MML and the SOL has become equal to 12 dB at a step 60. If the difference is less than 12 dB, the bias current is increased at the step 50, and the steps 51 through 59 are repeated. On the other hand, if the difference becomes equal to 12 dB, a bias current B at this point is read out at a step 61. This bias current B is the most suitable recording bias current for the tape being used.

Figure 11:
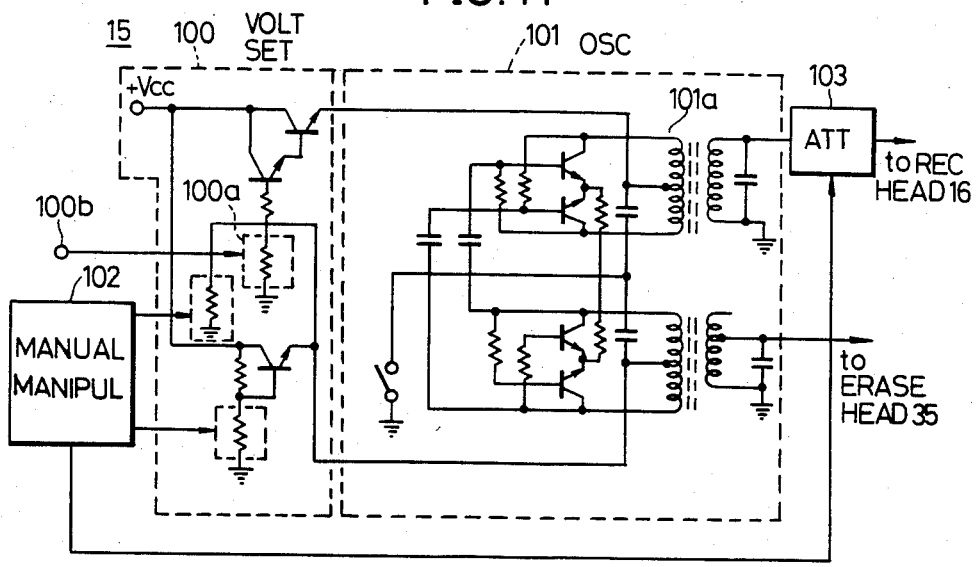
FIG. 11 is a concrete circuit diagram showing a bias oscillator within the block system shown in FIG. 1.

The bias oscillator 15 is constructed by a voltage setting part 100 and an oscillator part 101 shown in FIG. 11. In FIG. 11, a variable resistor 100a of the voltage setting part 100 is varied of the resistance, by a control signal supplied to a terminal 100b from the CPU 18. Hence, the output DC voltage of the voltage setting part 100 is varied. A bias voltage of an oscillator 101a of the oscillator part 101 is varied according to the output DC voltage of the voltage setting part 100. Accordingly, an output bias current level of the oscillator part 101 is obtained, according to a control signal from the CPU 18. In this case, an attenuator 103 is in a non-operational state.

If it is desirable not to automatically vary the bias current level, the bias current level of the oscillator part 101 and the attenuation rate of the attenuator 103 are varied manually, by manipulating a manual manipulation part 102.

Figure 12:
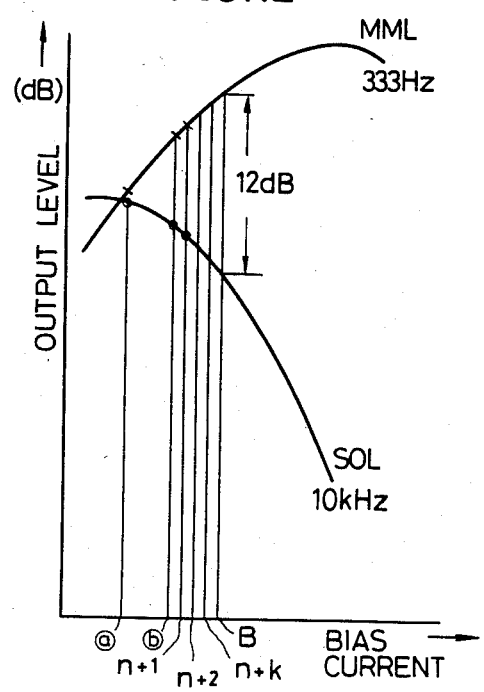
FIG. 12 is a graph showing a bias current versus output level characteristic for explaining another method of obtaining the recording bias current by the apparatus according to the present invention.

The detection on whether the difference between the MML and the SOL is equal to 12 dB, can be performed by a method other than that described in conjunction with FIG. 10. That is, the bias current may be increased roughly by a predetermined interval as indicated by ⓐ and ⓑ in FIG. 12. In this case, the bias current is increased by small intervals from a point where the difference between the MML and the SOL approaches 12 dB (the point ⓑ) as indicated by n+1, n+2, ... in order to obtain the 12 dB difference. Hence, as methods of obtaining the 12 dB difference between the MML and the SOL, the methos obtained by the combination of FIGS. 6 and 10, FIGS. 6 and 12, FIGS. 8 and 10, and FIGS. 8 and 12 can be considered.

Instead of the above method in which the input level and the bias current level are gradually increased from a low level, the input level and the bias current level may be gradually decreased from a high level. In the method shown in FIGS. 6 and 8 in which the input level is varied, for example, the MML and the SOL can be obtained within a shorter period of time if the input level is gradually varied from high level to low level.

The difference between the MML and the SOL gradually becomes large as the bias current level increases. Thus, the above 12 dB difference can be obtained with ease by increasing or reducing the bias current towards one direction.

Figure 13:
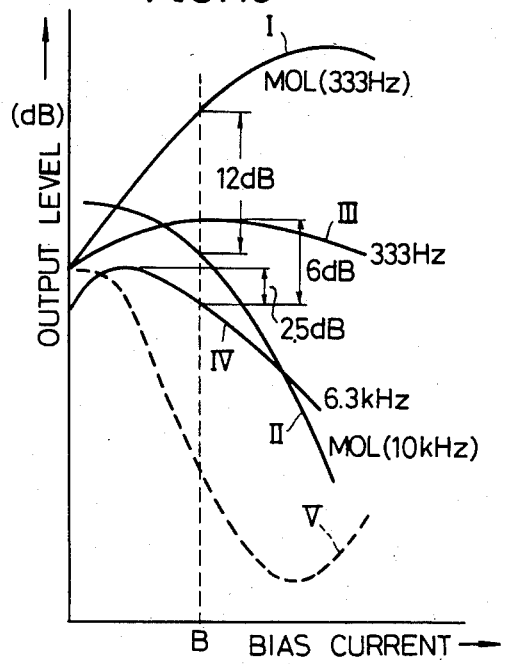
FIG. 13 is a graph showing a bias current versus output level characteristic for explaining a method of setting the recording bias current.

As shown in FIG. 13, in the apparatus according to the present invention, the bias current B where the difference between the MOL curve I of the first testing signal $f_1$ having the frequency 333 Hz and the MOL curve II of the third testing signal $f_3$ having the frequency 10 kHz becomes equal to 12 dB, is set as the recording bias current for the tape being used. This means that the internationally recommended method of setting the recording bias current is truely followed.

One conventional method of obtaining the recording bias current records a testing signal having a frequency of 333 Hz onto the tape by maintaining the recording level constant and gradually varying the bias current. The testing signal is then reproduced to obtain a curve III shown in FIG. 13, and a bias current at a point corresponding to a peak value is automatically detected to set this detected bias current as the recording bias current. Another method records and reproduces a testing signal from a testing signal generator having a frequency of 6.3 kHz as in the first method, to obtain a curve IV shown in FIG. 13. A point where there is a 2.5 dB reduction with respect to a peak value is automatically detected, and a bias current at this detected point is set as the recording bias current. Still another method records and reproduces signals having frequencies of 333 Hz and 6.3 kHz as in the above methods, to obtain the curves III and IV. In this third method, a point where there is a 6 dB reduction with respect to a peak value is automatically detected, and a bias current at this detected point is set as the recording bias current. These three conventional method all obtain the recording bias current by approximation. On the other hand, the recording bias current obtained according to the apparatus of the present invention is more accurate compared to that obtained by the above conventional methods using approximation, because the recording bias current is obtained by the above described method. The curves shown in FIG. 13 are obtained for any type of tape such as the normal type and chrome type tapes. Further, a curve V in FIG. 13 indicates a distortion characteristic curve of the signal having the frequency 333 Hz.

Next, description will be given with respect to a method of obtaining the recording bias current, capable of obtaining the recording bias current within a shorter period of time than the above described method.

Figure 14:
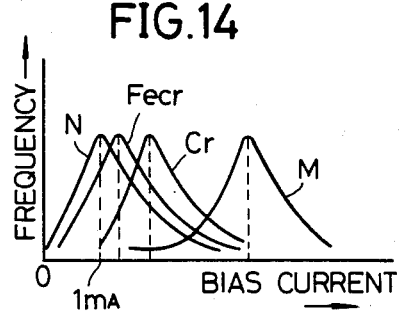
FIG. 14 is a graph for explaining a standard recording bias current set and recorded on the magnetic tape in advance.

As types of tapes, there are the normal type (N), chrome type (Cr), ferrichrome type (FeCr), metal type (M), and the like. These types of tapes respectively have a most suitable recording bias current exclusively for that tape. A result shown in FIG. 14 is obtained, if the most suitable recording bias current for each of the types of tapes of several manufacturers is obtained. For example, in the case of the normal type tape, the recording bias current is 1 mA for majority of tapes. Generally, the most suitable recording bias current preset for each of the tapes as shown in FIG. 14, is called the standard recording bias current. Even among the standard recording bias current thus set, there inevitably are irregularities according to the tape. In an embodiment of the invention which will be described hereinafter, the standard recording bias current is set as an initial recording bias current, and the actual most suitable recording bias current for the tape being used is obtained within a short period of time by starting from this initial recording bias current.

First, the bias current from the bias oscillator 15 is set to the standard recording bias current of 1 mA. Then, this 1 mA bias current operates the start switch 24. The first and third testing signals $f_1$ and $f_3$ are respectively recorded by increasing the levels and reproduced to obtain the MML of the first testing signal $f_1$ and the SOL of the third testing signal $f_3$ as in the above described embodiment, at the steps 51 through 59.

It will now be assumed that the MML of the first testing signal $f_1$ and the SOL of the third testing signal $f_3$ thus obtained (under the 1 mA standard recording bias current) respectively have values indicated by the marks "x" and "o" in FIG. 10, for example. The difference $M_x$ dB between the MML and the SOL is compared at a step 110 shown in FIG. 16, and the bias current is read at the step 60 if the difference $M_x$ dB is equal to 12 dB. When a step 111 detects that a difference $M_x$ dB is larger than 12 dB, the recording bias current is reduced at a step 113 towards a direction so that the difference between the MML and the SOL becomes equal to the 12 dB corresponding to the most suitable recording bias current. The input level and the output level are varied again to detect the MML of the first testing signal $f_1$ and the SOL of the third testing signal $f_3$ at the steps 51 through 59 shown in FIG. 3, under this reduced recording bias current. In this case, the difference between the MML and the SOL is constantly detected, and a bias current at a point where this difference becomes equal to 12 dB is set as the most suitable recording bias current for the tape being used.

On the other hand, if the difference $M_x$ dB between the MML and the SOL under the 1 mA standard recording bias current is less than 12 dB as shown in FIG. 17, the recording bias current is increased towards the direction of the 12 dB at a step 112 shown in FIG. 16. Then, the difference between the MML and the SOL is detected as in the above described case under this increased recording bias current, in order to obtain the most suitable recording bias current from the tape being used.

According to this method just described, the most suitable recording bias current can be obtained within a shorter period of time, as compared to the above described embodiment wherein the bias current is varied to a relatively large bias current from an exceedingly small bias current and the difference between the MML and the SOL is detected every time the bias current is varied so as to vary the bias current so that the above difference becomes equal to 12 dB (target value).

On the other hand, as shown in FIG. 18, if a difference $M_{x2}$ dB between the MML and the SOL is greatly different from the 12 dB, the varying step of the bias current may be set in the range of 0.3 mA. In addition, if a difference $M_{x1}$ dB between the MML and the SOL is not greatly different from the 12 dB, the varying step may be set in the range of 0.05 mA. By taking these measures, the most suitable recording bias current can be set within an even more shorter period of time. p The signal indicating that the type of tape has been selected at the tape selecting circuit 23 and the signal indicating that the difference 12 dB between the MML and the SOL has been detected, are supplied to a random access memory (RAM) 30 through the CPU 18, and stored in the RAM 30. The output of the RAM 30 is supplied to a video display generator (VDG) 31.

Figure 19A:
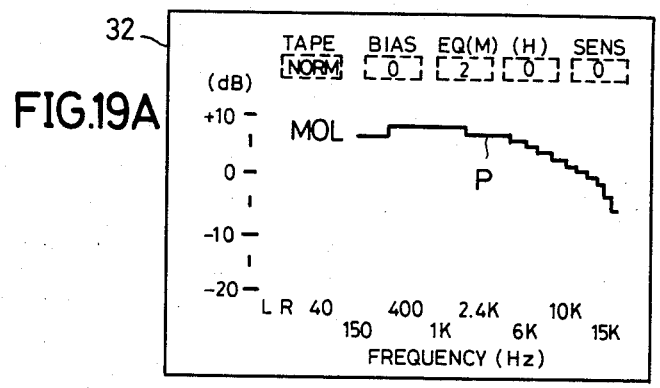
FIGS. 19A and 19B respectively show displays obtained by the apparatus according to the present invention.

Character information corresponding to Roman numerals, Arabic numerals, signs such as "+", "−", and "( )", and the like, and display position information corresponding to the display position on the screen of a display device 32 such as a cathode ray tube, are stored in the RAM 30. On the other hand, character (numeral) display character and MOL curve display character which will be described hereinafter, are preset in the VDG 31. The character display signal for displaying such information, for example, is serially obtained from the VDG 31 in synchronism with the vertical and horizontal synchronizing signals of the video signal. Accordingly, as shown in FIG. 19A, characters such as "FREQUENCY", "+10", "TAPE", "BIAS" are displayed at predetermined positions on the screen of the display device 32. In addition, if the normal type tape is selected, for example, an indication "NORM" is displayed on the column "TAPE" at a step 46 shown in FIG. 2. When the most suitable recording bias current is obtained, an indication "0" is displayed on the column "BIAS". While detecting the recording bias current, indications such as "+1" and "−3" indicating the difference from 12 dB are displayed on the column "BIAS".

Figure 20:
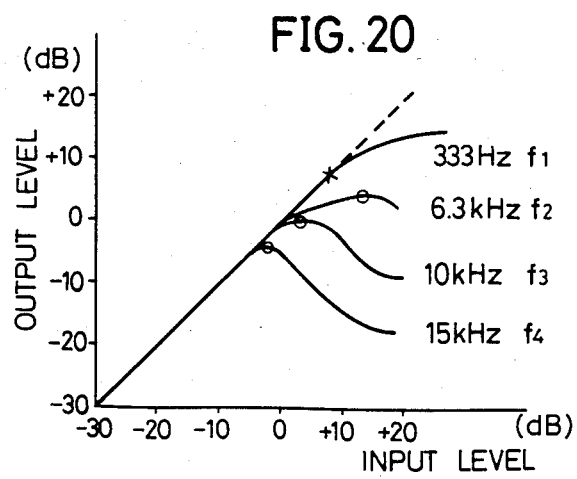
FIG. 20 is a graph showing an input level versus output level characteristic of the testing signal in the apparatus according to the present invention.

When the most suitable recording bias current is set at the step 42 shown in FIG. 2 as described above, the MOL curve of the tape being used is displayed at a step 43. Description will now be given with respect to the display of the MOL curve. The MOL (level $L_1$) of the first testing signal $f_1$ having the frequency 333 Hz and the MOL (level $L_3$) of the third testing signal $f_3$ having the frequency 10 kHz which are detected when obtaining the above recording bias current, are stored within the RAM 30. Hence, MOLs (levels $L_2$ and $L_4$) of a second testing signal $f_2$ having a frequency of 6.3 kHz and a fourth testing signal $f_4$ having a frequency of 15 kHz which are indicated by marks "o" in FIG. 20, can be obtained by the same method used in the case of the third testing signal $f_3$. The MOLs of the second and fourth testing signals $f_2$ and $f_4$ are obtained under the most suitable recording bias current.

MOL curve display signals respectively corresponding to the above levels $L_1$, $L_2$, $L_3$, and $L_4$ are selected at the CPU 18, and supplied and stored in the RAM 30. One character comprises six dots as shown in FIG.21, for example, and a figure display code signal (comprising a level axis signal and a frequency axis signal) is produced by the VDG 31 to display the respective dots by use of the MOL curve display character according to the signal from the RAM 30. This figure display code signal is serially obtained in synchronism with the horizontal and vertical synchronizing signals of the video signal, and supplied to the display device 32 such as a cathode ray tube which is driven by each of these synchronizing signals.

Figure 15:
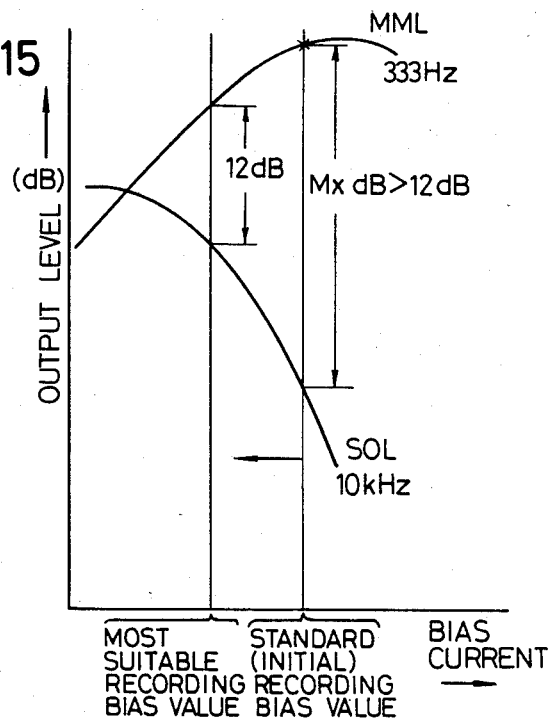
FIG. 15 is a graph showing a bias current versus output level characteristic for explaining a method of obtaining the recording bias current by another embodiment of the apparatus according to the present invention.

For example, a figure $P_1$ is displayed by a figure display code signal for displaying the MOL curve of the level $L_1$, a figure $P_2$ is displayed by a figure display code signal for displaying the MOL curve of the level $L_2$, and a figure $P_3$ is displayed by a figure display code signal for displaying the MOL curve of the level $L_3$. In this case, as shown in FIG.22, several kinds of information for obtaining a figure such as figures $A_1$ through $A_4$ which are set of the lengths along the directions of the level axis and the frequency axis are stored in the RAM 30. If respective display positions of the levels $L_2$ and $L_3$ are determined, for example, a figure display code signal for filling a part between the display position of the levels $L_2$ and $L_3$ is obtained. Accordingly, a figure $P_{23}$ is obtained, and the MOL curve due to the second testing signal $f_2$ having the frequency 6.3 kHz and the MOL curve due to the third testing signal $f_3$ having the frequency 10 kHz are displayed continuously. Similarly, the MOL curves due to the third testing signal $f_3$ and the fourth testing signal $f_4$ having the frequency 15 kHz are continuously displayed. As a result, a MOL curve P is displayed as a whole as shown in FIG.23 at the step 46 shown in FIG.2. The slopes of the MOL curves for frequencies less than or equal to 333 Hz are substantially the same in any type of tape (approximately a reduction of 2 dB with respect to the level of the first testing signal $f_1$). Hence, a figure $P_o$ shown in FIG.21 is displayed, for example, by the figure shown in FIG.15 which is stored in the RAM 30. The MOL curve shown in FIG.21 is displayed so that adjacent figures among the figures $P_o$, $P_1$, $P_2$, $P_{23}$, and $P_3$ are displayed continuously. Thus, although it is not possible to accurately observe the levels of the continuous parts, it is easy to monitor the curve as a whole.

When the MOL curve P is displayed on the display device 32 at the step 43 shown in FIG.2, the sensitivity adjustor 13 is operated at a step 44. The sensitivity is adjusted so that a constant output level is obtained by recording and reproducing the first testing signal $f_1$ having the frequency 333 Hz, for example. Next, the frequency characteristic adjustor 14 is operated at a step 45, and the frequency characteristic is adjusted so that the output level is a 20 dB reduction with respect to the input level when testing signals having a mid frequency of 6.3 kHz and a high frequency of 12.5 kHz are recorded and reproduced. While the sensitivity is being adjusted, numerals such as "+2" and "−1" are displayed on the column "SENS" and a numeral "0" is displayed on the column "SENS" when the sensitivity adjustment is completed as shown in FIG.19A, at the step 46. On the other hand, while adjusting the mid frequency characteristic and the high frequency characteristic, numerals such as "+3" and "−2" are displayed on the columns EQ(M) and (H) and a numeral "0" is displayed on these columns EQ(M) and (H) when the adjustment is completed as shown in FIG.19A, at the step 46. When each of the above adjustments are completed, the deviation from zero which is normalized with the standard value for each type of tape is displayed as a result, by numerals such as "+2" and "−1". The operator can observe the manner with which the recording bias current is set, the sensitivity is adjusted, and the frequency characteristic is adjusted, and also monitor the completion and the result of these operations by monitoring the columns.

The above MOL difference (the difference between the MML and the SOL) is not limited to the above 12 dB, and may be specified to 8 dB in an improved tape. The MOL difference can be specified when selecting the type of tape. In addition, a frequency of 31.5 Hz may be used as the mid frequency instead of the frequency 333 Hz, for example.

Next, description will be given with respect to spectrum display of the testing signal or the audio signal which is to be recorded.

Bandpass filters having center frequencies 40 Hz, 150 Hz, 400 Hz, 1 kHz, 2.4 kHz, 6 kHz, 10 kHz, and 15 kHz, and full-bandpass filters including all of these frequency bands, are independently provided for the R-channel and a left channel (L-channel) in a spectral display signal generator 36. Signals from the reproducing amplifier 20 in the R-channel and a reproducing amplifier (not shown) in the L-channel, and a control signal from the CPU 18 are supplied to the above spectral display signal generator 36. The spectral display signal generator 36 is constructed to accordingly band-divide the above signals and generate level display signals in accordance with the respective input levels, for each of the frequency bands.

Figure 19B:
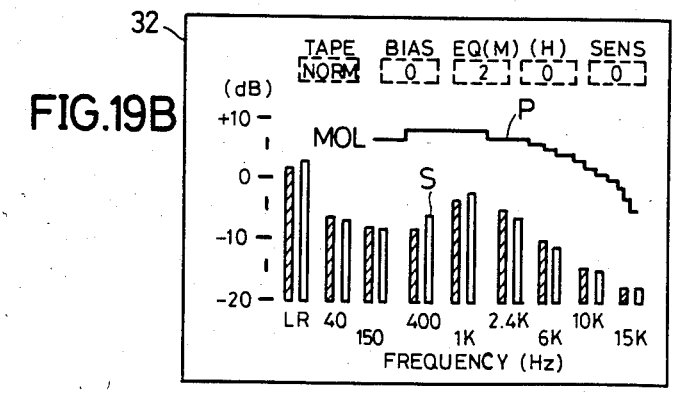

When spectral display is to be made with respect to the audio signal to be recorded, for example, the switching circuit 12 is switched over and connected to the side of the line amplifier, and the audio signal is recorded and reproduced independently for the R-channel and the L-channel. The signal from the reproducing amplifier 20 is converted into a spectral display signal at the spectral display signal generator 36 and stored in the RAM 30. Thereafter, the spectral display signal is obtained from the VDG 27 in synchronism with the vertical and horizontal synchronizing signals, and supplied to the display device 32. Accordingly, the levels of the input audio signal are displayed by bars S for each of the frequency bands together with the MOL curve P, as shown in FIG.19B. The operator can thus adjust the level so that the level bar S of the audio signal to be recorded does not exceed the MOL curve P, and as a result, a most suitable recording can be carried out.

The signal for displaying the MOL curve P is stored into the RAM 30 during the above described test. Hence, the MOL curve P of the tape being used remains displayed on the display device 32 even after the testing signals $f_1$ through $f_4$ disappear. In addition, if the spectral display signal generator 36 is operated when the above MOL curve P is obtained, it is possible to display the testing signals $f_1$ through $f_4$. A signal obtained from another output terminal 33 is supplied to a separate display device, printer, and the like.

The switching of the mode among the recording mode, reproducing mode, testing mode, and the like, is performed by a control signal from a control circuit 34.

As shown in FIG.5(A), the testing signal from the testing signal generator 25 is generated intermittently, and reproduced during the stopping interval in which the testing signal is not generated as shown in FIG.5(B). Thus, the effect of leakage of the recorded signal with respect to the reproduced signal can be reduced, when the apparatus according to the present invention is applied to an apparatus which carries out recording and reproduction by use of a head provided with the recording gap and the reproducing gap on the same head.

Moreover, because a logarithmic type analog-to-digital converter is used for the A/D converter 29, the dB value can be obtained by directly adding or subtracting the output of this A/D converter 29, and it is not necessary to separately provide a logarithmic converter. In addition, by using this type of A/D converter, the processing time at the CPU can be shortened compared to the case where a linear type analog-to-digital converter is employed, and the recording bias current can accordingly be set within a shorter period of time.

Further, the present invention is not limited to these embodiments, but various variations and modifications may be made without departing from the scope of the present invention.

What is claimed is:

1. An automatic recording bias current setting apparatus in a magnetic recorder for recording and reproducing an audio signal on and from a magnetic recording medium which is arbitrarily selected from among different types of magnetic recording mediums, said apparatus comprising:

bias current generating means for generating a bias current with varied level of the bias current;

testing signal generating means for sequentially generating two kinds of testing signals having different mid and high frequencies of the audio signal, said testing signal generating means including means for varying the levels of the testing signals;

recording and reproducing means for recording said two kinds of testing signals with said bias current onto the selected magnetic recording medium and for reproducing the same, said recording and reproducing means repeating an operation in which the two kinds of testing signals whose levels have been varied are recorded on the recording medium under the same bias current and are then reproduced, with respect to two or more different bias currents; and bias current setting means for detecting the the levels of the testing signals reproduced by the recording and reproducing means, and for setting the output bias current of said bias current generating means to an optimum level for the selected recording medium;

said bias current setting means having MML detecting means for detecting maximum modulation levels of the mid frequency testing signal for said two or more different bias currents, respectively, wherein the maximum modulation levels are output levels reproduced with a predetermined distortion factor, and SOL detecting means for detecting saturation output levels from among the detected levels of the high frequency testing signal for said two or more different bias currents, respectively, said bias current setting means detecting a bias current level at a point where a difference between a respective said maximum modulation level and a respective said saturation output level for the same bias current level becomes equal to a preset predetermined value, and setting the thus detected bias current level as said optimum level for the selected recording medium.

2. An automatic recording bias current setting apparatus as claimed in claim 1 in which said bias current detecting means repeats an operation in which the difference between the maximum reproduced output level of said mid frequency testing signal and the maximum reproduced output level of said high frequency testing signal is detected, under each respectively different sectioned bias current.

3. An automatic recording bias current setting apparatus as claimed in claim 1 in which said bias current detecting means repeats an operation in which the difference between the maximum reproduced output level of said mid frequency testing signal and the maximum reproduced output level of said high frequency testing signal is detected, under each respectively different sectioned bias current having a relatively large interval, and repeatedly performs said detection under each respectively different sectioned bias current from a point where said difference approaches a preset predetermined value.

4. An automatic recording bias current setting apparatus as claimed in claim 1 in which said bias current generating means is constituted by a voltage controlled amplitude varying type oscillator varied of the amplitude of its output signal according to a voltage which is varied by a digital signal.

5. An automatic recording bias current setting apparatus as claimed in claim 1 in which said bias current generating means can be operated by switching the setting between an automatic setting and a manual setting, capable of setting the amplitude of the bias current according to the type of said magnetic recording medium.

6. An automatic recording bias current setting apparatus as claimed in claim 1 in which said testing signal generating means comprises a memory controlled by a digital signal corresponding to a desired output oscillation frequency, and obtains a signal having said desired frequency by converting the digital signal from said memory corresponding to said desired frequency signal into an analog signal.

7. An automatic recording bias current setting apparatus as claimed in claim 1 comprising display signal producing means for dividing signals reproduced by said recording and reproducing means into respectively different frequency bands, and independently obtaining signals in accordance with said reproduced signals for each of said frequency bands; and display means for displaying a maximum output level curve and spectral bars on a display screen having a frequency axis and a level axis, by a signal from said bias current setting means and signals from said display signal producing means.

8. An automatic recording bias current setting apparatus as claimed in claim 1 comprising display signal producing means for dividing signals reproduced by said recording and reproducing means into respectively different frequency bands, and independently obtaining signals in accordance with said reproduced signals for each of said frequency bands; tape detecting means for detecting the tupe of the magnetic recording medium to be used; recording sensitivity and frequency characteristic adjusting and setting means for successively and automatically adjusting and setting the recording sensitivity, mid-frequency characteristic, and high frequency characteristic with which the recording is to be carried out with respect to said magnetic recording medium, after the recording bias current is set by said bias current setting means; and display means for displaying a maximum output level curve and spectral bars on a display screen having a frequency axis and a level axis, by a signal from said bias current setting means and signals from said display signal producing means, and also displaying the recording bias current, type of tape, recording sensitivity, and mid and high frequency characteristics on the display screen by signals obtained from said bias current setting means, tape detecting means, and recording sensitivity and frequency characteristic adjusting and setting means.

9. An automatic recording bias current setting apparatus as claimed in claim 1 comprising display means for displaying a maximum output level curve on a display screen having a frequency axis and a level axis, by a signal from said bias current setting.

10. An automatic recording bias current setting apparatus as claimed in claim 9 in which said display means displays said maximum output level curve after the recording bias current is set by said bias current detecting means.

11. An automatic recording bias current setting apparatus as claimed in claim 1 wherein said bias current setting means comprises level difference detecting respective reproduced output levels of said two kinds of testing signals, to detect a difference between respective maximum reproduced output levels; and comparing means for comparing said difference between the maximum reproduced output levels detected at said level difference detecting means with a preset predetermined value.

12. An automatic recording bias current setting apparatus as claimed in claim 11 in which said bias current generating means reduces the bias current when the difference between said maximum reproduced output levels is larger than said predetermined value under said standard recording bias current, and increases the bias current when said maximum reproduced output difference is less than said predetermined value under said standard recording bias current.

13. An automatic recording bias current setting apparatus as claimed in claim 11 in which said bias current generating means is set of the bias current reducing quantity and bias current increasing quantity according to the difference between the maximum reproduced output level difference and a predetermined level difference.

14. An automatic recording bias current setting apparatus as claimed in claim 11 in which said level difference detecting means comprises a logarithmic type analog-to-digital converter for subjecting said reproduced output levels to analog-to-digital conversion.

* * * * *